(12) United States Patent
Feng et al.

(10) Patent No.: US 8,120,764 B2
(45) Date of Patent: Feb. 21, 2012

(54) TILT SENSOR WITH POWER SAVING MECHANISM

(75) Inventors: Chung-Ping Feng, Hsinchu County (TW); Peng-Yu Chen, Taipei (TW)

(73) Assignee: Edison Opto Corporation, Taipei (TW)

( * ) Notice: Subject to any disclaimer, the term of this patent is extended or adjusted under 35 U.S.C. 154(b) by 101 days.

(21) Appl. No.: 12/839,421

(22) Filed: Jul. 20, 2010

(65) Prior Publication Data

US 2011/0235026 A1  Sep. 29, 2011

(30) Foreign Application Priority Data

Mar. 23, 2010 (TW) ................................ 99108589 A

(51) Int. Cl.
*G01B 11/26* (2006.01)
(52) U.S. Cl. ................. 356/139.1; 356/138; 356/139.04; 356/139.05; 356/139.06; 356/139.07; 250/206.1
(58) Field of Classification Search ........ 356/3.01–3.15, 356/4.01–4.1, 5.01–5.15, 6–22, 28, 28.5, 356/139.01–139.1
See application file for complete search history.

(56) References Cited

U.S. PATENT DOCUMENTS

| | | | | |
|---|---|---|---|---|
| 2006/0103733 | A1* | 5/2006 | Grady et al. | 348/208.3 |
| 2010/0101103 | A1* | 4/2010 | Horio et al. | 33/366.23 |

* cited by examiner

*Primary Examiner* — Thomas Tarcza
*Assistant Examiner* — Luke Ratcliffe
(74) *Attorney, Agent, or Firm* — CKC & Partners Co., Ltd.

(57) ABSTRACT

A tilt sensor with power-saving mechanism is provided. The tilt sensor includes a light-emitting element, a blocking object displaceable in an accommodating space on a baseboard, at least two first light sensors, a second light sensor and a control module. The first and the second light sensors respectively sense a light amount and a light amount variation according to the relative position of the light-emitting element and the blocking object. During a power-saving mode, when the light amount variation is larger than a specific value, the control module makes the light-emitting element work in a working mode to emit light according to a first current. During the work mode, when the light amount does not change or the light amount variation is smaller than a threshold value, the control module makes the light-emitting element work in the power-saving mode to emit light according to a second current.

9 Claims, 6 Drawing Sheets

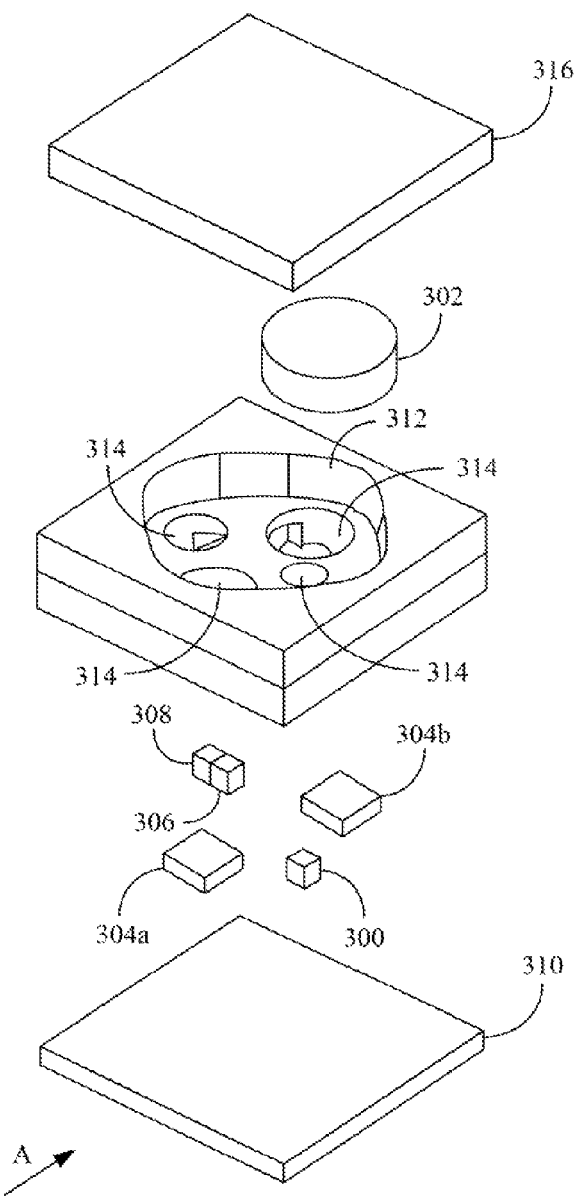
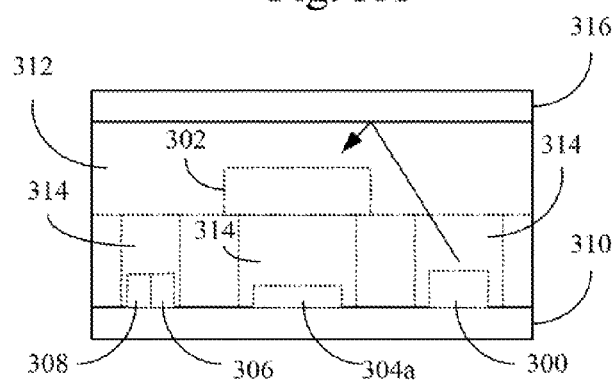
Fig. 3A
Fig. 3B

TILT SENSOR WITH POWER SAVING MECHANISM

RELATED APPLICATIONS

This application claims priority to Taiwan Application Serial Number 99108589, filed Mar. 23, 2010, which is herein incorporated by reference.

BACKGROUND

1. Technical Field

The present disclosure relates to an electronic apparatus for sensing. More particularly, the present disclosure relates to a tilt sensor with power-saving mechanism.

2. Description of Related Art

The electronic apparatus with image retrieving and displaying ability is popular in recent years. The photo taken by the user may be vertical or horizontal. Therefore, the users may have to rotate the camera to observe the image on the display screen of the camera in the right direction, which is quite inconvenient. Through the tilt sensor, a tilt angle is detected such that the camera can automatically adjust the image displayed on the screen.

However, the user may switch the angle of the camera in any time. Consequently, the sensing mechanism has to be kept active in any time. Under such a condition, no matter the user switches the direction of the camera or not, the sensing mechanism keeps dissipating the power, which is an undesirable result.

Accordingly, what is needed is a tilt sensor with power-saving mechanism. The present disclosure addresses such a need.

SUMMARY

An aspect of the present disclosure is to provide a tilt sensor with power-saving mechanism comprising: a light-emitting element, a blocking object, at least two first light sensors, a second light sensor and a control module. The light-emitting element is located on a baseboard to emit light according to a first current in a working mode and to emit light according to a second current in a power-saving mode, wherein the second current is smaller than the first current. The blocking object is displaceable in an accommodating space on the baseboard according to the gravity. The at least two first light sensors are is located on the baseboard to sense a light amount according to the relative position of the light-emitting element and the blocking object to determine a tilt angle of the tilt sensor during the working mode. The second light sensor is located on the baseboard to sense a light amount variation according to the relative position of the light-emitting element and the blocking object. When the light amount variation is larger than a specific value during the power-saving mode, the control module makes the light-emitting element work in a working mode, and when the light amount does not change or the light amount variation is smaller than a threshold value within a predetermined time period during the working mode, the control module makes the light-emitting element work in the power-saving mode.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiments, with reference made to the accompanying drawings as follows:

FIG. 3A is an exploded view of a tilt sensor in another embodiment of the present disclosure;

FIG. 3B is a side view of the tilt sensor from the direction A in FIG. 3A;

DETAILED DESCRIPTION

Figure 1A:
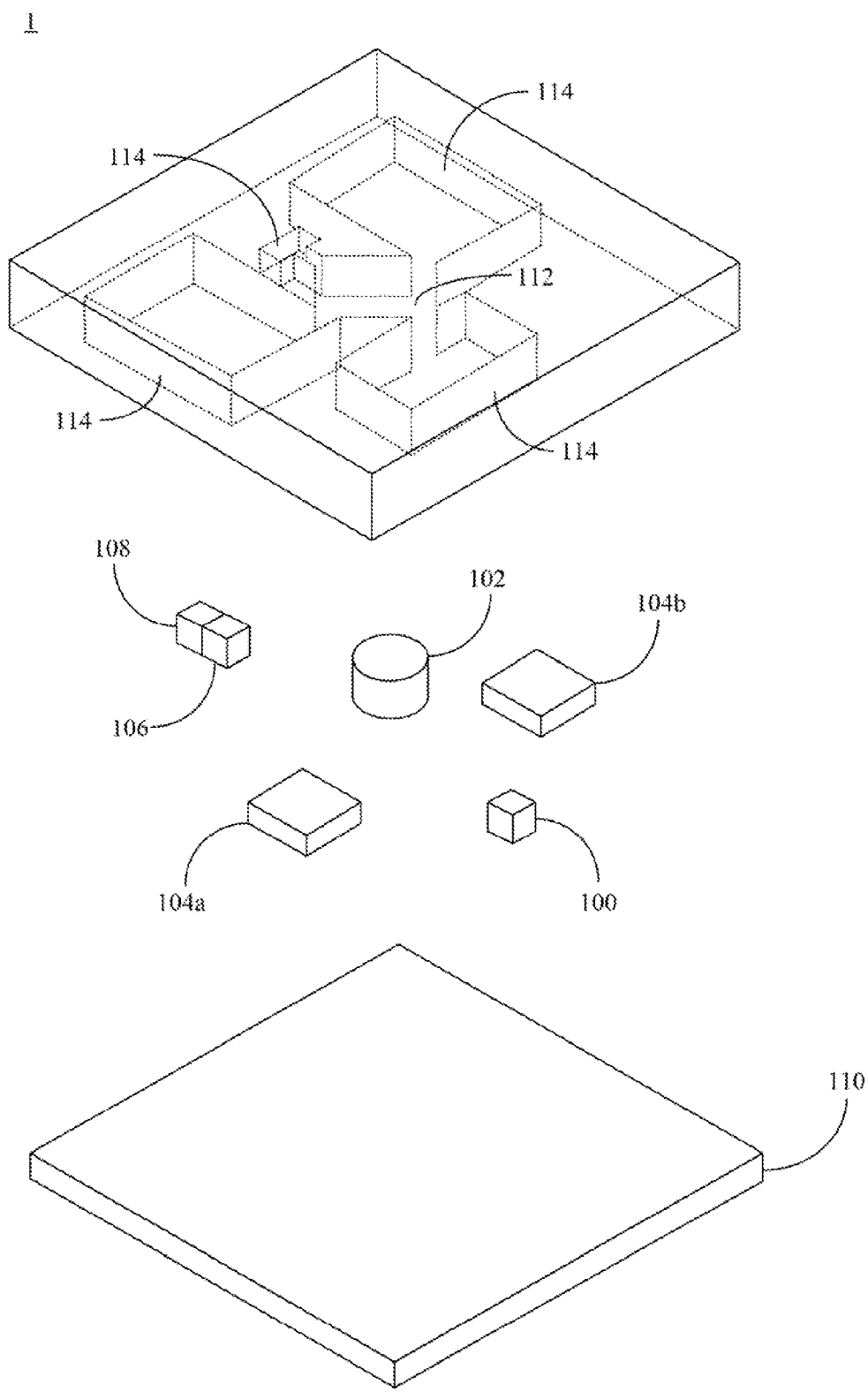
FIG. 1A is an exploded view of a tilt sensor with power-saving mechanism in an embodiment of the present disclosure.

Reference will now be made in detail to the present embodiments of the invention, examples of which are illustrated in the accompanying drawings. Wherever possible, the same reference numbers are used in the drawings and the description to refer to the same or like parts.

Figure 1B:
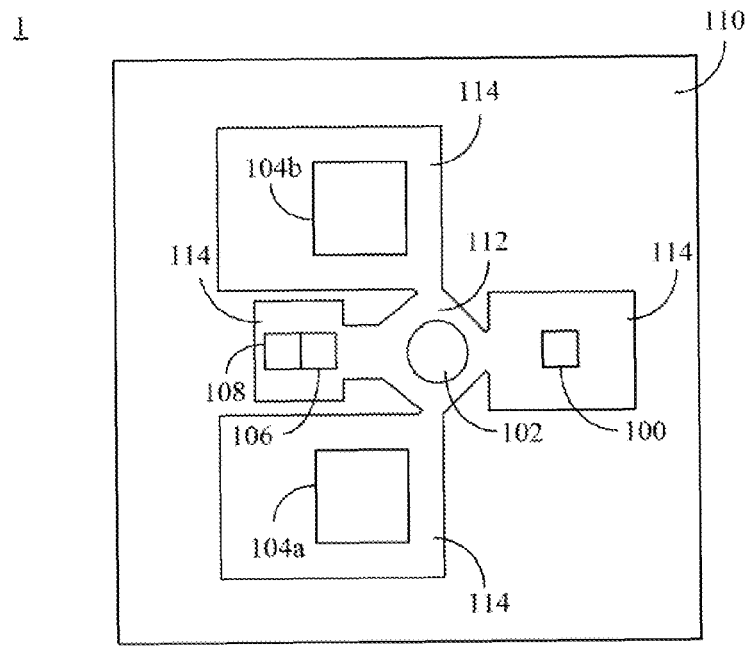
FIG. 1B is a top view of the tilt sensor in FIG. 1A.
Figure 1C:
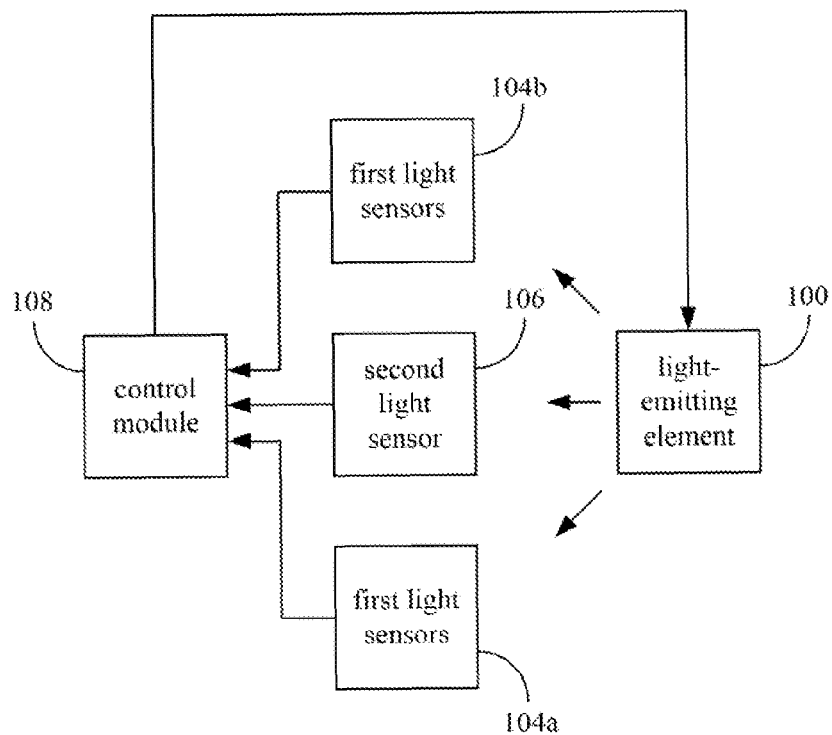
FIG. 1C is a block diagram of the tilt sensor in FIG. 1A.

Please refer to FIG. 1A, FIG. 1B and FIG. 1C. FIG. 1A is an exploded view of a tilt sensor 1 with power-saving mechanism in an embodiment of the present disclosure. FIG. 1B is a top view of the tilt sensor 1 and FIG. 1C is a block diagram of the tilt sensor 1. In the present embodiment, the tilt sensor 1 comprises: a light-emitting element 100, a blocking object 102 (not shown in FIG. 1C), two first light sensors 104a and 104b, a second light sensor 106 and a control module 108.

The light-emitting element 100 is located on a baseboard 110 (not shown in FIG. 1C) to emit light according to a first current in a working mode and to emit light according to a second current in a power-saving mode, wherein the is second current is smaller than the first current such that the light-emitting element 100 can save power during the power-saving mode. For example, in an embodiment, the first current ranges from 0.1 mA to 100 mA, and the second current is below the 50% of the first current. Thus, the light-emitting element 100 emits a weaker light during the power-saving mode. In other embodiments, the range of the first and the second current can be adjusted according to the different situations.

The blocking object 102 is displaceable in an accommodating space 112 on the baseboard 110 according to the gravity. In an embodiment, the blocking object 102 is a cylindrical object that is able to roll in the accommodating space 112. In other embodiments, the blocking object 102 can be a spherical object or other shapes of object that is easy to rotate or to roll.

Each of the light-emitting elements 100, the two first light sensors 104a and 104b, the second light sensor 106 and the control module 108 is located in a surrounding space 114. The surrounding spaces 114 and the accommodating space 112 are on the same surface of the baseboard 110. The surrounding spaces 114 are surrounding and are connected to the accommodating space 112. Accordingly, the light emitted by the light-emitting element 100 is able to be transmitted to the accommodating space 112. The blocking object 102 further blocks all or parts of the light emitted by the light-emitting element 100 according to its position. If the light is not totally blocked by the blocking object 102, the part of the light that is not blocked by the blocking object 102 is further transmitted to the position of the two first light sensors 104a and 104b and the second light sensor 106.

The two first light sensors 104a and 104b are on the two opposite sides relative to the light-emitting element 100 in the present embodiment to sense a light amount according to the relative position of the light-emitting element 100 and the blocking object 102. It's noticed that in different embodiments, the light-emitting element 100 can generate different kinds of light such as RGB light or infrared light. Consequently, the first light sensors 104a and 104b can be different kinds of sensors as well. In a preferred embodiment, the light-emitting element 100 generates the infrared light, and the first light sensors 104a and 104b are the type of sensors that are able to detect the infrared light. During the work mode, the first light sensors 104a and 104b sense a light amount according to the relative position of the light-emitting element 100 and the blocking object 102 to determine a tilt angle of the tilt sensor 1 during the working mode.

Figure 2A:
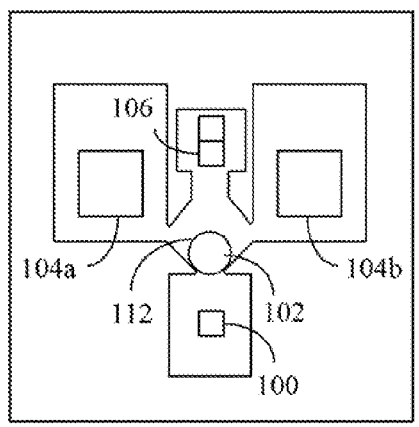
FIG. 2A to FIG. 2D are the top views of the tilt sensor depicted in FIG. 1A to FIG. 1C in different angles.
Figure 2B:
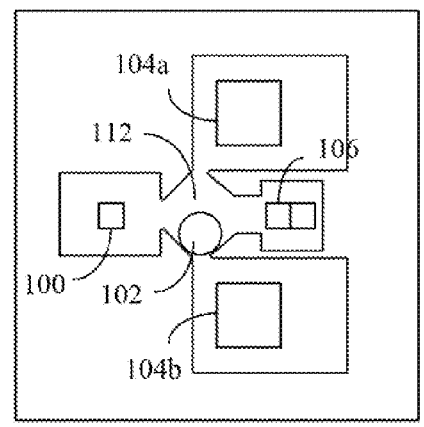

Please refer to FIG. 2A to FIG. 2D. FIG. 2A to FIG. 2D are the top views of the tilt sensor 1 depicted in FIG. 1A to FIG. 1C in different angles. In FIG. 2A, the blocking object 102 in the accommodating space 112 displaces to the front of the light-emitting element 100 to block the light from the light-emitting element 100. Therefore, the first light sensors 104a and 104b can hardly sense the light. The light amount sensed by the first light sensors 104a and 104b is an extremely small value or 0. Therefore, the light amount can be expressed as (0, 0). In FIG. 2B, the position of the blocking object 102 makes the blocking object 102 blocks the part of the light toward the direction of the first light sensor 104b. However, the part of the light toward the direction of the first light sensor 104a is not blocked. The light amount sensed by the first light sensor 104b is thus much smaller than the light amount sensed by the first light sensor 104a. The light amount sensed by the first light sensor 104a and the first light sensor 104b can be expressed as (1, 0). Accordingly, the angle of the tilt sensor 1 in FIG. 2B can be determined, which is 90 degrees (clockwise) relative to the position of the tilt sensor 1 in FIG. 2A.

Figure 2C:
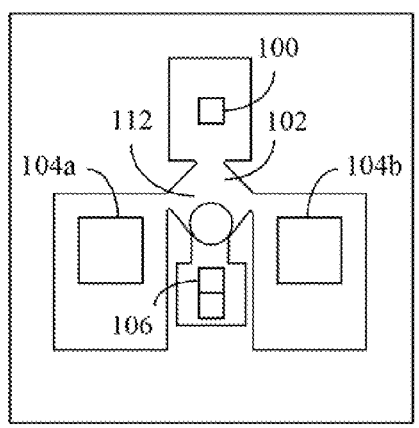
Figure 2D:
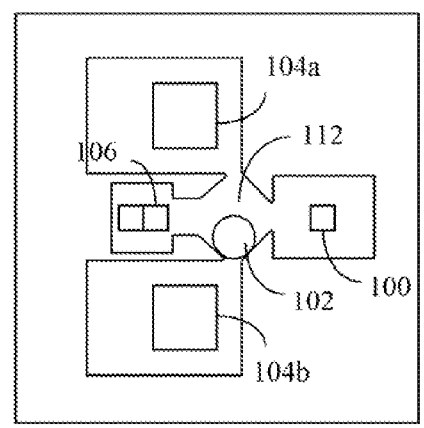

In FIG. 2C, the blocking object 102 doesn't block the light toward the direction of both the first light sensors 104a and 104b. Both the first light sensors 104a and 104b sense a greater amount of light than the first light sensors 104a and 104b in FIG. 2A. The light amount sensed by the first light sensor 104a and the first light sensor 104b can be expressed as (1, 1). Accordingly, the angle of the tilt sensor 1 in FIG. 2C can be determined, which is 180 degrees relative to the position of the tilt sensor 1 in FIG. 2A. In FIG. 2D, the position of the blocking object 102 makes the blocking object 102 block the part of the light toward the direction of the first light sensor 104a. However, the part of the light toward the direction of the first light sensor 104b is not blocked. The light amount sensed by the first light sensor 104a is thus much smaller than the light amount sensed by the first light sensor 104b. The light amount sensed by the first light sensor 104a and the first light sensor 104b can be expressed as (0, 1). Accordingly, the angle of the tilt sensor 1 in FIG. 2D can be determined, which is 90 degrees (counterclockwise) relative to the position of the tilt sensor 1 in FIG. 2A.

Accordingly, the first light sensor 104a and the first light sensor 104b can sense the light amount according to the relative position of the light-emitting element 100 and the blocking object 102 to determine a tilt angle of the tilt sensor 1 during the working mode.

During the working mode, when the light amount sensed by the first light sensors 104a and 104b is not changed within a predetermined time period, the tilt sensor 1 is in a stable situation. In other words, the tilt sensor 1 is not rotated by the user for a period of time. For instance, if the light amount sensed by the first light sensors 104a and 104b keeps in the state of (1, 1) over the predetermined time period, the control module 108 can determine that the tilt sensor 1 stays in the position depicted in FIG. 2C over the predetermined time period. Therefore, control module 108 makes the light-emitting element 100 operate in the power-saving mode. That is to say, the control module 108 makes the current supplying the light-emitting element 100 switch from the first current to the second current, which is much smaller than the first current.

The second light sensor 106 is located on the baseboard 110 as well. In an embodiment, the second light sensor 106 is in the same chip as where the control module 108 locates. In another embodiment, the second light sensor 106 and the control module 108 can be located on different chips but electrically connected to each other. The second light sensor 106 senses a light amount variation according to the relative position of the light-emitting element 100 and the blocking object 102. The sensitivity of the second light sensor 106 is higher than the first light sensors 104a and 104b. Thus, when a slight change of the position of the tilt sensor 1 makes the blocking object 102 displace, the light amount variation can be detected by the second light sensor 106 right away. In the present embodiment, the second light sensor 106 is placed in a light-emitting direction of the light-emitting element 100 to sense the light amount variation directly. In other embodiments, the second light sensor 106 can be placed in other positions where the second light sensor 106 is still able is to sense the light of the light-emitting element 100.

During the power-saving mode, when the light amount variation is larger than a specific value, the control module 108 determines that the position of the tilt sensor 1 starts to change. Thus, the control module 108 makes the light-emitting element 100 operate in the working mode. That is to say, the control module 108 makes the current supplying the light-emitting element 100 switch from the second current to the first current, which is larger than the second current. The first light sensors 104a and 104b can perform the angle-sensing mechanism according to the light amount again.

In another embodiment, whether the power-saving mechanism is activated or not can be determined according to the second light sensor 106. When the light amount variation sensed by the second light sensor 106 is smaller than a threshold value, the control module 108 can determine that the tilt sensor 1 stays in the same position over the predetermined time period. Thus, the control module 108 makes the light-emitting element 100 operate in the power-saving mode when the light amount variation sensed by the second light sensor 106 is smaller than the threshold value.

It's noticed that the location of the control module 108 and the second light sensor 106 can be different in other embodiments. For example, the control module 108 and the second light sensor 106 need not to be placed in an independent surrounding space 114 as depicted in FIG. 1A and FIG. 1B. The control module 108 and the second light sensor 106 are able to be located in the same surrounding space 114 as where the first light sensor 104a or 104b locates. The space cost can thus be reduced.

In the present embodiment, the tilt sensor 1 can determine when to enter the power-saving mode according to the light amount sensed by the first light sensors 104a and 104b or the light amount variation sensed by the second light sensor 106 such that the light-emitting element 100 emits light according to a smaller current when the position of the tilt sensor 1 doesn't change. Therefore, the power dissipation can be greatly reduced. Further, the second light sensor 106 is able to detect the light amount variation and wake up the light-emitting element 100 when the position of the tilt sensor 1 starts to change.

Please refer to FIG. 3A and FIG. 3B. FIG. 3A is an exploded view of a tilt sensor 3 of another embodiment of the present disclosure. FIG. 3B is a side view from the direction of A of the tilt sensor 3 in FIG. 3A. The tilt sensor 3 comprises: a light-emitting element 300, a blocking object 302, two first light sensors 304a and 304b, a second light sensor 306 and a control module 308.

The tilt sensor 3 in the present embodiment further comprises four bottom spaces 314 located between the baseboard 310 and the accommodating space 312. The first light sensors 304a and 304b, the second light sensor 306 and the light-emitting element 300 are located in the bottom spaces 314. Each of the bottom spaces 314 has an opening smaller than the blocking object 302 and the opening is connected to the accommodating space 312. Therefore, the blocking object 302 is displaceable only in the accommodating space 312. The tilt sensor 3 in the present embodiment further comprises a top covering 316 to prevent the blocking object 302 from leaving the accommodating space 312. The first light sensors 304a and 304b and the second light sensor 306 is able to sense a reflected light generated according to the light-emitting element 100 through each of the opening of the bottom spaces 314, as depicted in FIG. 3B. Consequently, the control module 308 can make the light-emitting element 300 switch between the power-saving mode and the working mode according to the sensing result.

It's noticed that the relative position of each elements of the tilt sensor can be different from the above two embodiments. The number of the first light sensors, the relative position of each element and module and the shape of the spaces can be adjusted according to different situations as well.

Figure 4:
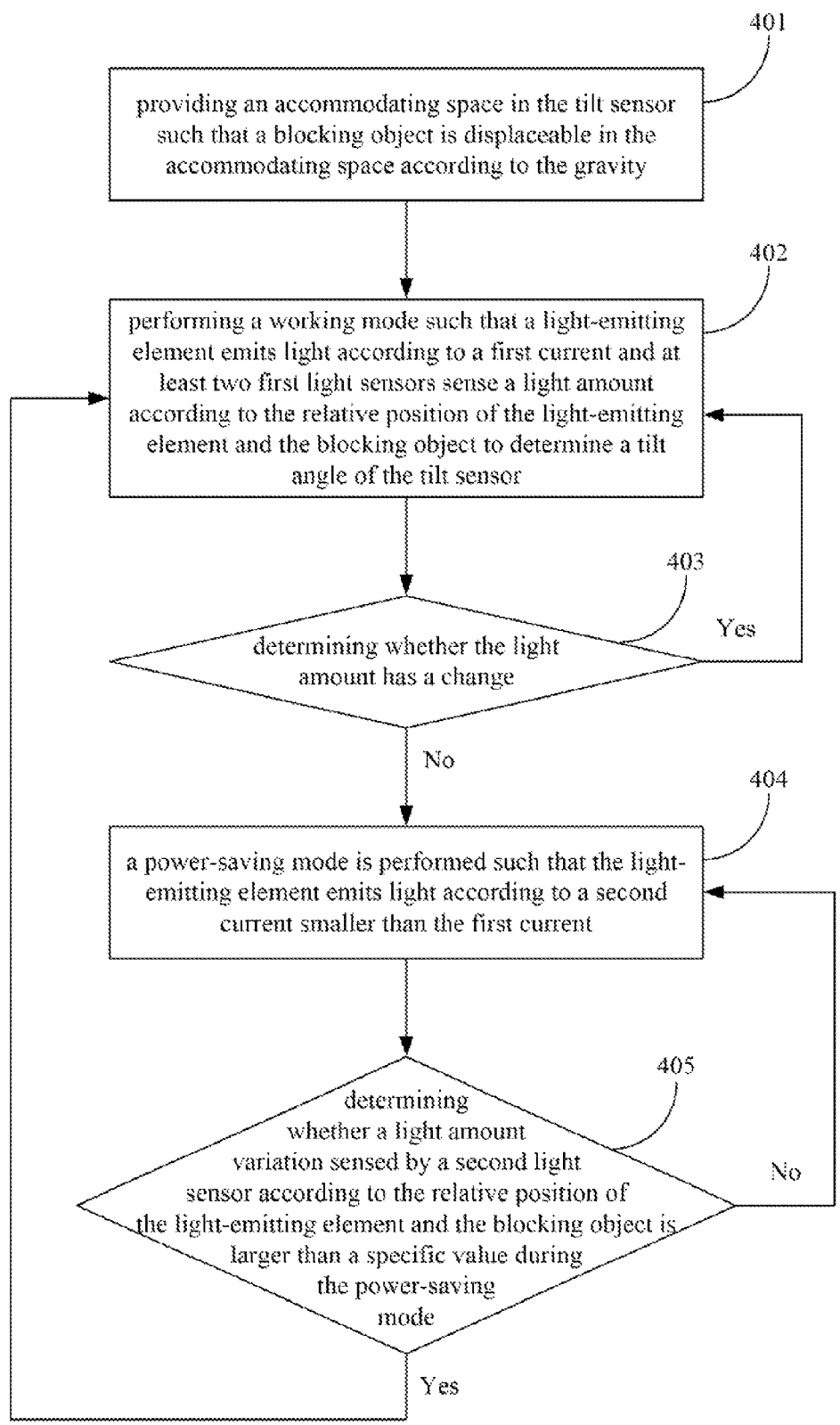
FIG. 4 is a flow chart of an operation method to operate a tilt sensor with power-saving mechanism in an embodiment of the present disclosure.

Please refer to FIG. 4. FIG. 4 is a flow chart of an operation method to operate a tilt sensor with power-saving mechanism in an embodiment of the present disclosure. The operation method can be adapted to the tilt sensor 1 depicted in FIG. 1A to FIG. 1C and the tilt sensor 3 depicted in FIG. 3A to FIG. 3B. In the present embodiment, the tilt sensor 1 is used to explain how the operation method works. The operation method comprises the following steps. (The steps are not recited in the sequence in which the steps are performed. That is, unless the sequence of the steps is expressly indicated, the sequence of the steps is interchangeable, and all or part of the steps may be simultaneously, partially simultaneously, or sequentially performed).

In step 401, an accommodating space 112 is provided such that a blocking object 102 is displaceable in the accommodating space 112 according to the gravity. In step 402, a working mode performed such that a light-emitting element 100 emits light according to a first current and two first light sensors 104a and 104b sense a light amount according to the relative position of the light-emitting element 100 and the blocking object 102 to determine a tilt angle of the tilt sensor 1. In step 403, whether the light amount has a change is determined. When the light amount doesn't change within a predetermined time period, a power-saving mode is performed such that the light-emitting element 100 emits light according to a second current smaller than the first current in step 404. Then in step 405, whether a light amount variation sensed by a second light sensor 106 according to the relative position of the light-emitting element 100 and the blocking object 102 is larger than a specific value is determined during the power-saving mode. When the light amount variation is larger than the specific value, the working mode is performed.

Figure 5:
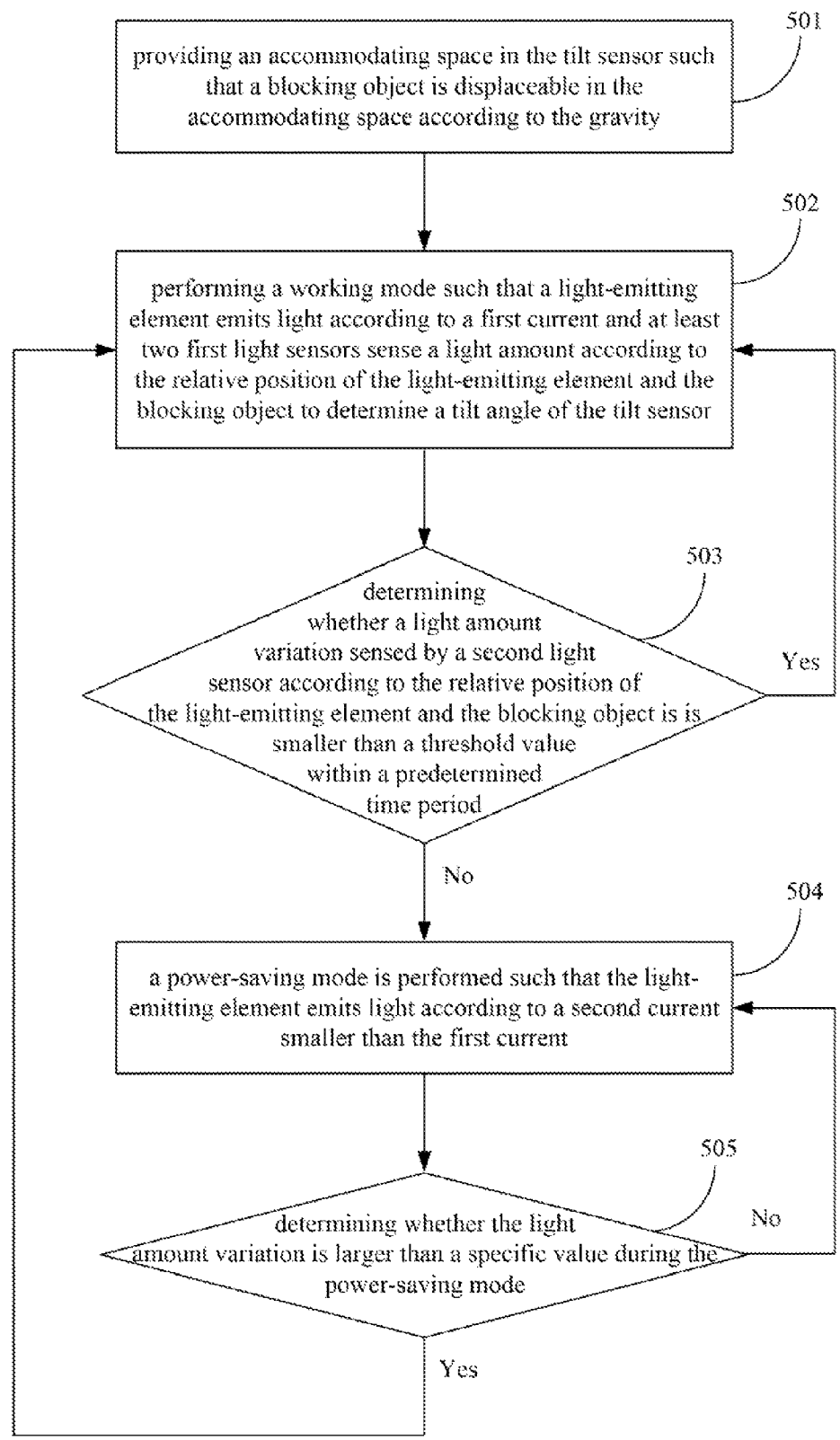
FIG. 5 is a flow chart of an operation method to operate a tilt sensor with power-saving mechanism in another embodiment of the present disclosure.

Please refer to FIG. 5. FIG. 5 is a flow chart of an operation method to operate a tilt sensor with power-saving mechanism in another embodiment of the present disclosure. The operation method can be adapted to the tilt sensor 1 depicted in FIG. 1A to FIG. 1C and the tilt sensor 3 depicted in FIG. 3A to FIG. 3B. In the present embodiment, the tilt sensor 1 is used to explain how the operation method works. The operation method comprises the following steps. (The steps are not recited in the sequence in which the steps are performed. That is, unless the sequence of the steps is expressly indicated, the sequence of the steps is interchangeable, and all or part of the steps may be simultaneously, partially simultaneously, or sequentially performed).

In step 501, an accommodating space 112 is provided such that a blocking object 102 is displaceable in the accommodating space 112 according to the gravity. In step 502, a working mode performed such that a light-emitting element 100 emits light according to a first current and two first light sensors 104a and 104b sense a light amount according to the relative position of the light-emitting element 100 and the blocking object 102 to determine a tilt angle of the tilt sensor 1. In step 503, whether a light amount variation sensed by a second light sensor 106 according to the relative position of the light-emitting element 100 and the blocking object 102 is smaller than a threshold value within a predetermined time period is determined. When the light amount variation is smaller than the threshold value within a predetermined time period, a power-saving mode is performed such that the light-emitting element 100 emits light according to a second current smaller than the first current in step 504. Then in step 505, whether the light amount variation is larger than a specific value during the power-saving mode is determined. When the light amount variation is larger than the specific value, the working mode is performed.

The tilt sensor and the operation method thereof provided in the present disclosure can be adapted to different kinds of tilt sensors that have different shape of body and accommodating space and different number of elements. The tilt sensor in the present embodiment can determine when to enter the power-saving mode according to the light amount sensed by the first light sensors or the light amount variation sensed by the second light sensor such that the light-emitting element emits light according to a smaller current when the position of the tilt sensor doesn't change. Therefore, the power dissipation can be greatly reduced. Further, the second light sensor is able to detect the light amount variation and wake up the light-emitting element when the position of the tilt sensor starts to change.

It will be apparent to those skilled in the art that various modifications and variations can be made to the structure of the present disclosure without departing from the scope or spirit of the invention. In view of the foregoing, it is intended that the present disclosure cover modifications and variations of this invention provided they fall within the scope of the following claims.

What is claimed is:
1. A tilt sensor with power-saving mechanism comprising:
a light-emitting element located on a baseboard to emit light according to a first current in a working mode and to emit light according to a second current in a power-saving mode, wherein the second current is smaller than the first current;
a blocking object displaceable in an accommodating space on the baseboard according to the gravity;
at least two first light sensors located on the baseboard to sense a light amount according to the relative position of the light-emitting element and the blocking object to determine a tilt angle of the tilt sensor during the working mode;

a second light sensor located on the baseboard to sense a light amount variation according to the relative position of the light-emitting element and the blocking object; and a control module, wherein when the light amount variation is larger than a specific value during the power-saving mode, the control module makes the light-emitting element work in a working mode, and when the light amount does not change or the light amount variation is smaller than a threshold value within a predetermined time period during the working mode, the control module makes the light-emitting element work in the power-saving mode.

2. The tilt sensor of claim 1, further comprising a plurality of surrounding spaces located on the same surface of the baseboard as where the accommodating space locates, wherein the plurality of surrounding spaces are surrounding and are connecting to the accommodating space, each of the first light sensors, the second light sensor and the light-emitting element is located in one of the surrounding spaces.

3. The tilt sensor of claim 2, wherein the second light sensor is placed in a light-emitting direction of the light-emitting element.

4. The tilt sensor of claim 1, further comprising a plurality of bottom spaces located between the accommodating space and the baseboard each having an opening connected to the accommodating space, wherein each of the opening is smaller than the blocking object such that the blocking object is only displaceable in the accommodating space, each of the first light sensors, the second light sensor and the light-emitting element is located in one of the is bottom spaces.

5. The tilt sensor of claim 4, wherein the at least two first light sensors and the second light sensor sense a reflected light generated according to the light-emitting element through each of the opening of the bottom spaces.

6. The tilt sensor of claim 1, wherein the blocking object is a cylindrical or a spherical blocking object.

7. The tilt sensor of claim 1, wherein the first current ranges from 0.1 mA to 100 mA, and the second current is below the 50% of the first current.

8. The tilt sensor of claim 1, wherein the second light sensor and the control module are on the same chip.

9. The tilt sensor of claim 1, wherein the sensitivity of the second light sensor is higher than the first light sensors.

* * * * *